United States Patent [19]
Wells

[11] Patent Number: 5,510,656
[45] Date of Patent: Apr. 23, 1996

[54] WAVE ENERGY CONVERTER

[76] Inventor: Alan A. Wells, Grove House, Bridge Road, Mepal, Ely Cambridgshire CB6 2AR, England

[21] Appl. No.: 137,018

[22] PCT Filed: Apr. 16, 1992

[86] PCT No.: PCT/GB92/00711

§ 371 Date: Nov. 2, 1993

§ 102(e) Date: Nov. 2, 1993

[87] PCT Pub. No.: WO92/18704

PCT Pub. Date: Oct. 29, 1992

[30] Foreign Application Priority Data

Apr. 17, 1991 [GB] United Kingdom .................. 9108152

[51] Int. Cl.⁶ ............................ F03B 13/10; F03B 13/00; F03B 13/12; H02P 9/04
[52] U.S. Cl. .................. 290/53; 290/42; 290/43; 290/54
[58] Field of Search .................... 60/495, 497, 501; 290/42, 43, 53, 54; 405/15, 226; 415/905

[56] References Cited

U.S. PATENT DOCUMENTS

| 2,190,003 | 2/1940 | van Hulsk | 405/15 |
| 2,919,552 | 1/1960 | Hayward | 405/226 |
| 4,221,538 | 9/1980 | Wells | 415/905 |
| 4,383,413 | 5/1983 | Wells | 60/497 |
| 4,719,754 | 1/1988 | Nishikawa | 60/501 |
| 5,005,357 | 4/1991 | Fox | 60/495 |

FOREIGN PATENT DOCUMENTS

| 876966 | 10/1979 | Belgium . |
| 131774 | 7/1984 | Japan . |
| 949352 | 2/1964 | United Kingdom . |

Primary Examiner—Steven L. Stephan
Assistant Examiner—Christopher Cuneo

[57] ABSTRACT

In a method and apparatus for anchoring a structure such as a wave collector, sediment is pumped from the sea bed into the base of the structure. Hydraulic tuning of a wave energy converter collector, an advantageous rotor structure and a means of smoothing wave-to-electricity energy conversion are also described and claimed.

9 Claims, 8 Drawing Sheets

WAVE ENERGY CONVERTER

The present invention relates to a converter for transforming wave energy into electrical energy. The invention comprises several novel and inventive aspects but in particular, new forms of wave collector, a special rotor arrangement for driving a generator and method of anchoring the apparatus to the sea bed.

Since the 1970's there has been increasing concern about the earth's finite fossil fuel resource and about environmental polution resulting from combustion of such fuels. This has led to considerable efforts to develop new and cost-effective means of obtaining energy from renewable sources. In particular, there has been much interest in how to derive usable energy from solar, geothermal, wind and wave sources. The latter two offer the prospect of generating electricity by directly converting the kinetic energy of wind or waves into electrical energy.

Theoretically, waves constitute an enormous reservoir of energy to be exploited. However, their random nature and the hostility of the marine environment pose significant problems to the practical realisation of a cost-effective wave-to-electricity energy converter.

Although deep water offers the largest incident power flows, it has been realised that the mass, rigidity and complex engineering necessary to enable the equipment to survive in that environment makes it uneconomic. Another reason is that deep water structures must float and this reduces the conversion efficiency.

It is now known that depth of about 10 fathoms is about optimum. Although incident power flows reduce with decreasing depth, so do construction, installation and operating costs.

However, a viable design for a converter designed to operate at this depth has not been realised up to now.

We have now devised such a viable structure, which in accordance with a first aspect of the present invention, provides a wave collector comprising a substantially hollow annuloid shell having at least one opening for ingress of waves.

In use, the at least one opening is situated below the water so that waves entering through the opening impart their kinetic energy to the mass of air in the collector, above the water line.

In the context of this specification, the term "substantially hollow annuloid shell" is intended to refer to any closed substantially hollow structure which defines a substantially hollow core through the middle thereof. Thus, in radial cross-section, the outer and inner circumferences of the shell may be substantially circular, i.e. the shell is a true annulus or ring. However, annuloid structures which in radial section are elliptical, polygonal or any other closed hollow shape with a central core are also within the scope of the present invention.

The shape of the core itself may be of any convenient kind, for example generally cylindrical. Although the core itself will usually be substantially hollow, in some embodiments it may be advantageous to locate some of the ancilliary equipment of the wave collector inside the core. Moreover, in many embodiments, the core will be open to the external environment at both ends thereof. However, it is also within the scope of the invention for the hollow core to be substantially closed at one or both ends, provided that means are provided to enable water and/or air to enter and exit the core substantially freely.

It is especially preferred for stability reasons and for optimal wave tuning that the diameter of the annuloid shell is not substantially less than its height.

Overall, the annuloid configuration provides good stability whilst the collector is being towed in the water and when it is anchored in place for operation. At the same time, it provides an advantageous arrangement for the containment and ducting of the air which takes up the kinetic energy of the waves. The structure is also particularly cost-effective in terms of raw material and labour costs incurred during construction.

In axial cross section, the annuloid collector may also have any convenient shape, for example circular.

However, it is preferred that the collector should be generally toroidal, i.e. generally in the shape of a torus. A torus is an annular structure having a semicircular axial profile with the flat side of the semicircle facing inwardly towards the core.

It is particularly preferred that the collector is formed as an isotorus. An isotorus is a toroidal shell of uniform thickness having a modified circular cross-section so that it has constant axial membrane stress throughout. A common example of an isotorus is a pneumatic tyre having a small rim diameter.

FIG. 1 shows the general radial profile of an isotorus in a cartesian co-ordinate system. Closed solutions can be derived from the aforementioned requirement of constant axial membrane stress as follows:

The reference radius of the isotorus, at which the walls are tangential to planes normal to the axis of symmetry, is considered to be R; the internal pressure is p and the constant biaxial membrane force N/unit length. The inclination of the normal to the shell from the plane of symmetry is taken to be $\phi$, and the Cartesian co-ordinates of the shell surface are described by x and y, where the x axis is the axis of symmetry. In consideration of axial equilibrium of the shaded volume it follows that, for meridional membrane force N, $$2\pi y N \cos\phi = \pi(R^2 - y^2)p, \quad \cos\phi = \frac{1}{2m}\left(\frac{1-\beta^2}{\beta}\right) \quad (1)$$

where $$\alpha = \frac{x}{R}, \quad \beta = \frac{y}{R}, \quad m = \frac{N}{pR}.$$

solving for $\beta$, including the extreme values, $$\beta = \sqrt{m^2\cos^2\phi + 1} - m\cos\phi, \quad (2)$$

$$\beta_{max,min} = \sqrt{m^2 + 1} \pm m$$

In consideration of the hoop membrane force N it may be noted that the meridional and hoop radii of curvature $r_1$ and $r_2$ are given respectively by $$\frac{dy}{\sin\phi, d\phi}$$

and $y \sec\phi$ The condition for equilibrium normal to the shell surface, which is $$p = \frac{N}{r_1} - \frac{N}{r_2},$$

may then be written in the form, $$\left(\frac{1+\beta^2}{2\beta^2}\right)d\beta = m\sin\phi \cdot d\phi,$$

or by integrating, $$\cos \phi = \frac{1}{2m} \left( \frac{1-\beta^2}{\beta} \right) \quad (3)$$

as in equation (1). The shell is thus proven to exhibit constant biaxial membrane forces throughout.

For the determination of and $\alpha$ and x it is first noted that (using equation (2)), $$\frac{d\alpha}{d\beta} = \cos \phi,$$

so that $$\alpha = \int_0^\phi m \cos \phi \left( 1 - \frac{m \cos \phi}{\sqrt{m^2 \cos^2 \phi + 1}} \right) d\phi =$$

$$m \sin \phi - \frac{m^2}{\sqrt{m^2+1}} \int_0^\phi \frac{\cos^2 \phi \cdot d\phi}{\sqrt{1 - \frac{m^2}{m^2+1} \sin^2 \phi}} = \quad (4)$$

$$m \sin \phi - \left[ \sqrt{m^2+1} \, E\left(\phi, \frac{m}{\sqrt{m^2+1}}\right) - \frac{1}{\sqrt{m^2+1}} F\left(\phi, \frac{m}{\sqrt{m^2+1}}\right) \right] \quad (5)$$

as collated by H B Dwight, Tables of integrals and other mathematical data, McMillan, N.Y., 1961, case 782.01.

E() is the elliptic integral of the second kind, and F() the elliptic integral of the first kind. Both are tabulated from $$\phi = 0 \text{ to } \frac{\pi}{2}$$

in Jahnke-Emde, Tables of functions, Dover, 1945. For values of $$\phi \geq \frac{\pi}{2}$$

the property of antisymmetry of the functions E() and F() may be taken into consideration, arising from the nature of the integrals.

It may also be demonstrated by reference to equation (2) et seq, by differentiation, that the meridional radius of curvature is, $$\frac{r_1}{R} = m\left(1 - \frac{m \cos \phi}{\sqrt{m^2 \cos^2 \phi + 1}}\right) = \frac{2m\beta^2}{1+\beta^2} \quad (6)$$

with the extreme values $$m\left(1 \pm \frac{m}{\sqrt{m^2+1}}\right) \text{ at } \phi = 0,$$

$$m\left(1 + \frac{m}{\sqrt{m^2+1}}\right) \text{ at } \phi = r,$$

the value m at $$\phi = \frac{\pi}{2}$$

with a continuous increase from intrados to extrados.

For the normal torus of major radius r and minor radius $\rho$ the largest stress under pressure p is meridional at the intrados, with the value $$N = \frac{p\rho}{2} \cdot \frac{2r - \rho}{r - \rho}$$

For comparison with the isotorus the non-dimensional values $$r = \sqrt{m^2 + 1}, \; \rho = m$$

are substituted, whence the ratio of the maximum pressure stresses in the isotorus and normal torus becomes, Ratio  =  (isotorus uniform pressure stress)/(normal torus maximum pressure stress)  (7)

$$= \frac{\sqrt{m^2+1} - m}{\sqrt{m^2+1} - \frac{m}{2}}$$

with the value 0.453 for m=1.

Table 1 shows isotorus shape factors for several values of m; FIG. 2 shows a graphical representation for the same values of m.

The negative values of $\alpha$ at $\phi = \pi$ may be noted, which indicate the differing cross-sections of the torus and isotorus.

TABLE 1

| m | $m^2+1$ | $\frac{m}{\sqrt{m^2+1}}$ | $\frac{\sqrt{m^2+1}-m}{\sqrt{m^2+1}-\frac{m}{2}}$ | | $\phi=0$ | $\frac{\pi}{4}$ | $\frac{\pi}{2}$ | $\frac{3\pi}{4}$ | $\pi$ |
|---|---|---|---|---|---|---|---|---|---|
| 0.5 | 1.1180 | 0.4472 | 0.712 | E() | 0 | 0.771 | 1.489 | 2.206 | 2.977 |
| | | | | F() | 0 | 0.800 | 1.660 | 2.520 | 3.320 |

TABLE 1-continued

| m | m²+1 | $\frac{m}{\sqrt{m^2+1}}$ | $\frac{\sqrt{m^2+1}-m}{\sqrt{m^2+1}-\frac{m}{2}}$ | φ= | 0 | $\frac{\pi}{4}$ | $\frac{\pi}{2}$ | $\frac{3\pi}{4}$ | π |
|---|---|---|---|---|---|---|---|---|---|
| 1 | 1.4142 | 0.7071 | 0.453 | α | 0 | 0.207 | 0.321 | 0.141 | −0.359 |
|   |        |        |       | β | 0.618 | 0.707 | 1 | 1.414 | 1.618 |
|   |        |        |       | E() | 0 | 0.748 | 1.351 | 1.953 | 2.701 |
|   |        |        |       | F() | 0 | 0.826 | 1.854 | 2.882 | 3.708 |
| 2 | 2.2361 | 0.8944 | 0.191 | α | 0 | 0.233 | 0.401 | −0.0168 | −1.198 |
|   |        |        |       | β | 0.414 | 0.518 | 1 | 1.932 | 2.414 |
|   |        |        |       | E() | 0 | 0.724 | 1.179 | 1.633 | 2.357 |
|   |        |        |       | F() | 0 | 0.857 | 2.261 | 3.665 | 4.522 |
|   |        |        |       | α | 0 | 0.178 | 0.375 | −0.598 | −3.248 |
|   |        |        |       | β | 0.236 | 0.318 | 1 | 3.146 | 4.236 |

Preferably, one opening in the shell for ingress of waves extends completely around the outer circumference. Both such openings preferably also extend from just above half the height of the collector, but still below the intended sea level, down to approximately one quarter of the height. Above and below the opening(s), the shell then effectively comprises an upper canopy and a lower canopy, respectively. The two canopies are kept apart by a cage structure consisting of struts which impart the necessary strength and rigidity but otherwise allow sea water to pass therebetween. The overall shape of the isotorus shell is best understood by reference to FIGS. 6–8 which show a preferred embodiment of a wave energy convertor based on the isotorus and described in detail hereinbelow.

A second aspect of the present invention provides a wave collector comprising a generally hollow canopy having at least one opening for ingress of-waves, said canopy having an internal datum level defining a median water level when in use, said at least one opening defining a water inlet area, wherein the ratio of the water inlet area to the internal cross-sectional area of the canopy at the internal datum level being less than 0.7.

The area of the at least one water inlet area means the total surface area of all such inlets in a given canopy.

Preferably the ratio is less than 0.6, especially less than 0.5 but preferably more than 0.4.

It is also preferred that the generally hollow canopy has a substantially hollow profile.

Such a spherical profile canopy may be substantially perfectly spherical in shape or approximately spherical. Moreover it may be in the form of a complete sphere or complete approximate sphere (except for any openings therein) or it may be a truncated sphere or truncated approximate sphere.

A particularly preferred form of wave collector according to the second aspect of the present invention is termed herein, a "sphere-polyhedron collector". This is conveniently described by reference to an especially preferred form thereof, hereinafter called a "three cell sphere-tetron collector". Tetron is an abbreviation of tetrahedron.

In general, the sphere-polyhedron configuration comprises a substantially spherical profile canopy having an inflated polyhedral internal shell. In use, the collector is embedded in the sea-bed (or similar) sediment and the canopy is part-filled with sediment to substantially the level of the external bed or higher. The sediment base may then constitute one side of a polyhedron shape. Conveniently, one vertex of the inflated polyhedron as located at the top of the spherical canopy.

Any reference herein to a polyhedron or an inflated polyhedron includes both a substantially perfect polyhedron or substantially perfect inflated polyhedron, and an approximate polyhedron or approximate inflated polyhedron. The terms "polyhedral" and "inflated polyhedral" are to be construed likewise. By "inflated" is meant having outwardly curved sides.

At least one cut-away portion of the canopy defining a circular or part-circular opening abutting a side of the base of the inflated polyhedral internal shell, is provided for ingress of waves. Most preferably, a plurality of such openings are provided, respectively abutting each of the sides of the base of the internal shell along straight sides of the openings.

The overall shape of the especially preferred three cell sphere tetron-collector is best understood by reference to FIGS. 11 and 12. These show a preferred embodiment of a wave energy convertor based on the latter collector shape and described in more detail hereinbelow.

In an alternative embodiment of the second aspect of the invention, a variant of the three cell sphere tetron-collector may be fabricated for deep water applications. Instead of the inflated tetrahedron internal shell, a conical or frustoconical internal shell may be provided. Conveniently, this conical or frustoconical shell may be slip-formed from concrete. This variant is not limited to provision of three cells but fewer and more cells are also possible.

Since the internal shell of these preferred sphere-polyhedron (and variant) collectors defines a substantially hollow core, albeit closed at the top, such collectors are also within the definition of the first aspect of the invention.

The characteristics of the three cell sphere-tetron collector is comparison with the isotorus shape are as follows:

1. proportionately larger entry/exit cross-sections for wave motion, extending nearly to the seabed, hence improved hydraulic efficiency;
2. up to 25% increase of fully enclosed sediment mass;
3. a broader base, with adequate stability against overturning,
4. unimpaired structural support for the turbo generator housing, and comparable pneumatic flow paths;
5. easier construction with modular fore fabrications (less plate waste; less weld lengths);
6. reduced steel mass (−30%) for given service stresses (smaller plate thicknesses; reduced weld deposit volumes), and
7. stabilisation required for seabed sediment only; much less stone armour (referred to hereinbelow) being required only under the cone vertices.

When a wave collector/wave energy convertor according to the present invention has been towed to its intended operational marine site, a suitable mass such as pumped sediment can be introduced into the lower canopy area to anchor the collector to the sea bed. One preferred method of such anchoring constitutes a further aspect of the present invention and as such, is described in more detail hereinbelow.

To optimise air flow patterns above the water line for efficient driving of a rotor coupled to a generator, the upper canopy area is preferably divided into a plurality of cells by a plurality of radial dividers. These dividers prevent air flow from one cell to another. Therefore, the lower edges of the dividers extend below the water-line. For collectors according to the first aspect of the present invention, these lower edges conveniently extend diagonally inwards and downwards to traverse the opening(s) inn the shell. For collectors according to the second aspect of the present invention, it is preferred to provide respective separate openings in the canopy for each of the cells.

It is envisaged that in most embodiments of collectors according to the first aspect of the present invention, at least two radial dividers/cells would be provided, or alternatively, from three to five. Three dividers/cells are especially preferred for collectors according to the second aspect of the present ivention. In most applications, all such dividers would probably be arranged with comparable radial spacing.

As well as the wave collector, the wave energy converter as a whole must comprise means for converting the kinetic energy of the moving air into electrical energy. Whilst this may be achieved using any suitable technology which will be apparent to those skilled in the art, conveniently it may be effected by means of a rotor arranged to drive a generator.

Preferably, the generator and rotor are arranged in a housing located centrally above the collector. Ducts must be provided for conveying the air from the collector to the rotor in the housing.

One preferred form of rotor is the so-called Darius rotor. Essentially, the Darius rotor comprises a plurality of aerofoil-shaped blades, preferably of symmetric cross-section, extending longitudinally between an upper and a lower support so as to form a pseudo-spherical cage.

The aerofoil-shaped blades provide radial lift with a circumferential component of torque, always in the direction of the leading edges, irrespective of inward or outward radial airflow. Therefore, if a plurality of ducts convey air from cells of the collector, no matter in which direction the air is flowing in each duct, it will always impart rotational motion in the same direction to the rotor. Therefore, these airflows cannot effectively cancel one another in terms of their action on the rotor.

The Darius rotor has previously only been used unenclosed for windmill applications. The arrangement of a Darius rotor in an enclosed housing communicating with air ducting demonstrates synergy by virtue of the resultant reciprocating multi-phase airflow. The arrangement provides a more uniform torque when fully utilising the quadrature wave components of heave and surge induced pitch, thereby extracting much more of the available power from each wave.

Thus a third aspect of the present invention comprises a wave energy converter comprising a Darius-type rotor arranged in a housing provided with at least one opening for directing an oscillating air flow onto or away from the rotor in an axisymmetric manner, wherein the rotor comprises a plurality of blades in a substantially catenary shape such that centrifugal loads are substantially balanced by blade tension-forces.

In the context of the present invention, the term "Darius-type rotor" means a plurality of spaced, substantially constant cord and substantially zero incidence aerofoil blades in cage structure formation and substantially axially aligned relative to an axis of rotation so that radial fluid flow into and out of the cage structure causes the structure to rotate about said axis. Generally, the resultant rotation will occur at a substantially constant peripheral speed with respect to the exposed length of each blade.

The advantage of this configuration is that in principle, it can provide four times the power, for a given diameter, tip speed and blade/space ratio (solidity) compared with a single plane rotor. Conveniently, the blades are supported in tension with respect to centripetal forces by adopting the catenary form, so that approximately one rotor radius of blade length is exposed to radial airflow. Therefore the cage structure form is preferably identical to, or as closely approximate to this shape as is feasible.

The above definition of the Darius-type rotor indicates the essential geometry of the blades in the cage structure in the region of intended incident flow. Any suitable configuration may be employed in the region where the blades are attached to the aforementioned upper and lower supports.

It is especially preferred that the blades are substantially uniformally spaced within the cage structure. Preferably, the number of blades incorporated in the cage structure is from 3 to 25, for example from 5 to 20, more preferably from 9 to 15.

However, the optimum number in any given application will depend on the overall size of the structure, the power of the incident flow and the characteristics of the associated generator.

A variant of the Darius rotor is described in UK Patent Specification GB 1 595 700. The radial (Darius) and axial (variant) directions are interchanged. The variant is described as located in a housing for direct conversion of wave energy. As mentioned above, the Darius-type rotor has not previously been described mounted in a housing for conversion of wave energy transmitted via air movement.

In the high speed pneumatic application herein described, as compared with the variant, the Darius-type configuration not only retains efficient blade support with similar maximum centrifugal stresses, but has the additional advantages:

1. more uniform peripheral velocity distribution,
2. elimination of cyclic axial thrust and
3. two stages as an intrinsic property to improve power density at the lower solidities desirable for high efficiency operation.

In accordance with the third aspect of the present invention, we may also claim the Darius-type rotor in a housing with at least one opening communicating with a wave collector via a passage allowing movement of air therebetween.

In any event, it is preferred that the housing has a plurality of openings. Most preferably, at least two openings are provided for transmission of air to and from the wave collector and one or more additional openings communicate with the outside atmosphere.

Most preferably, the rotor is a substantially classical Darius rotor per se. FIG. 3 shows the generalised shape of the Darius rotor in a cartesian co-ordinate system. In use, there would be a plurality of such rotors arranged uniformally around the x axis so that the rotor would rotate around the x axis as shown by the symbol $\omega$.

Centripetal accelerations are radial, whence for this case $P=P_o \sec \theta$. For mass w per unit length, $w\omega^2 yds \cos \theta = Pd\theta$.

$$\frac{d\theta}{dx} = \frac{w\omega^2}{P_o} y \cos \theta \qquad (8)$$

Lift normal to aerofoil is $\pi c \rho V \upsilon$ and tension is uniform with respect to s in this case. Whence, $\pi c \rho \omega y \upsilon \cos \theta \, ds = Pd\theta$ $$\frac{d\theta}{dx} = \frac{\pi c \rho \omega \upsilon}{P} y \qquad (9)$$

If aerofoil braced to this profile by distributed wires normal to the aerofoil in the radial plane, oscillating lift forces will cause no vibration as rotation occurs, and constant tension will be maintained with regard to centripetal accelerations. Similarly, there will be no virbration if, from equation 8, $w=w. \sec \theta$, and the initial profile satisfies equation 9. Putting equation 9 into the form $$\frac{d\theta}{dx} = Ay,$$

differentiating with respect to x, and noting that $$\frac{dy}{dx} = -\tan \theta, \text{ gives } \frac{d^2\theta}{dx^2} = -A \tan \theta.$$

Now putting $$p = \frac{d\theta}{dx},$$

it follows that $$\frac{d^2\theta}{dx^2} = \frac{dp}{dx} = \frac{d\theta}{dx} \frac{dp}{d\theta} = p \frac{dp}{d\theta} = -A\tan\theta$$

Then $$p_o dp = -A \tan \theta d\theta, \text{ and } \frac{p^2 - p_o^2}{2} = A \ln \cos \theta.$$

Whence, since $p_o = \frac{1}{R_o}$ $$\frac{dx}{R_o} = \frac{d\theta}{\sqrt{1 + m \ln \cos \theta}}, \qquad (10)$$

where $m = \frac{2\pi c\rho\omega\upsilon R_o^2}{P}$, $$\frac{dy}{R_o} = -\frac{dx}{R_o} \tan \theta \left[ \text{Also}, m = \frac{2R_o}{r} \right]$$

These may be integrated numerically to derive x and y for increments of $\theta$ for various specified values of the constant m. Some ideal Darius rotor shapes for different values of m are shown in FIG. 4.

In addition the swept area favor is $$\frac{1}{R_o^2} \int_o^v y dx,$$

and the torque factor is $$\frac{1}{R_o^2} \int_o^v y \cos \theta \, dx.$$

More conveniently, put $$\frac{1}{r^2} \int_o^\theta y \, dx = \alpha, \frac{1}{r^2} \int_o^\theta y \cos \theta \, dx = \beta,$$

where r is the radius at $\theta = 0$,

R being the radius of curvature. For incident wind velocity $\upsilon$ the reference work rate per unit of swept area is $$\frac{16}{27} \cdot \frac{\rho v^3}{2}$$

Hence, total work rate E given by, $$E = \frac{16}{27} \frac{\rho v^3}{2} 4\alpha r^2 \qquad (11)$$

The tangential driving force per unit length of aerofoil of constant chord c is $\pi c \rho \upsilon^2$. Hence the average torque for n blades is $$T = n\pi c\rho\upsilon^2 \gamma r^2 \qquad (12)$$

But angular velocity $$\omega = \frac{V}{r}$$

at maximum radius, and $$\frac{V}{v} = 2\pi$$

for unit lift coefficient. Since $T\omega = E$ by equating 11 and 12, $$\frac{nc}{r} = \frac{32}{27\pi} \frac{v}{V} \frac{\alpha}{\beta} = \frac{16}{27} \frac{C_L}{\pi^2} \frac{\alpha}{\beta} \qquad (13)$$

Also, $P = w\omega^2 Rr$, $P = \pi c \rho \omega v Rr$, $$\left( \text{also stress } \sigma, = \frac{m\gamma v^2}{2} \text{ from centripetal acceleration} \right). \qquad (14)$$

P. is always tension, but P alternates in sign. For limiting case of zero P.–P, and no compression, from (13 and 14), $$\frac{k\gamma}{\rho} \geq \frac{27n\pi^2\beta}{32\alpha} \qquad (15)$$

where $w=k\gamma c^2$ and $\gamma$ is aerofoil density; k is a shape factor.

FIG. 5 illustrates operation of the Darius Rotor in Axisymmetric flow.

For zero incidence, the average tip speed V and inflow velocity $\upsilon$, the lift coefficient $$C_L = \frac{2\pi v}{V}$$

and for chord c the lift/unit length is $\pi c\rho V\upsilon$, where fluid density is $\rho$. For average radius r, the torque/unit length= $\pi c r \rho \upsilon^2$.

For n blades, each of effective length 2kr the total torque is $2kn\pi cr^2 \rho \upsilon^2 = 4\pi^2 k\sigma r^3 \rho \upsilon^2$, where $$\sigma = \frac{nc}{2\pi r}$$

is solidity. Power E, obtained by multiplying by $\omega$ and substituting for $\upsilon$ in terms of $C_L$ and $V=\omega r$, is $$E = k\sigma C_L^2 \rho \omega^3 r^5 \qquad (16)$$

By definition, the inflow is $2\pi kr^2\upsilon = kC_L \omega r^3$, which may be divided into equation 16 to obtain the pressure difference.

Thus, in terms of head h, for the two stage device, it is verified that, $$h = \frac{\sigma C_L \omega^2 r^2}{g} \quad (17)$$

Given E and h, r and σ may be obtained from equations 16 and 17 as, $$r = \left[ \frac{E}{k C_L \omega \rho g h} \right]^{1/3} \quad \sigma = \left[ \frac{k^2 \rho^2 g^5 h^5}{C_L \omega^4 E^2} \right]^{1/3} \quad (18)$$

Equations 18 can be used to calculate rotor radius and the product of blade chord and number of blades in terms of the solidity ratio σ.

Examination of equation 15 emphasises the importance of using steel for the blades, in order that vibrations and lift induced fatigue stress effects should be mimimised.

The consequence in terms of equation 14 is that centrifugal stresses, at 380N/mm² for steel are well within the strength (<¼) of steel wire, such as is used for concrete prostressing. Moreover, the standard conical wedge grip for prestressing tendons is well developed, efficient, trustworthy and can be densely packed.

The best form of blade construction would then be a parallel group of such wires in a g.r.p. matrix.

However, for cost effectiveness reasons, it is preferred that the individual blades comprise short glass fibre loaded polyethylene extruded to aerofoil section around a longitudinal matrix of high strength steel wires, each about 5 mm diameter. The ends of these protrude beyond the polyethylene, and are located in conical holes in the upper and lower supports referred to above. These ends are wedge gripped in the holes with a standard, compact tool as used for post tensioning of steel wire tendons in concrete. The effect of centripetal force is to place the blades in tension, and their slight flexibility permits them to take up the rotor shape. The shape m=2 is most preferred in terms of a well maintained blade radius over the operative region, without lengthening the shaft so as to detract from its resistance to axial load and whirling collapse.

As mentioned above, a preferred form of a wave collector structure according to the first or second aspect of the invention is towed to the chosen marine site and anchored to the seabed by weighting of the lower canopy area. However, a preferred method of anchorage, as well as being novel and inventive, is also applicable to the anchoring of other marine structures and the like.

Thus, a fourth aspect of the present invention provides a method of anchoring a structure to the bed of the sea or other body of water, the method comprising anchoring the structure in or with sediments on the bed and at least partially stabilising the sediments by treating them with lime water and carbon dioxide.

The fourth aspect of the invention also extends to any structure when anchored by this method.

The sediments may be pumped into the structure to lie in the lower part thereof. The sediments may also, in addition or in the alternative, be heaped up around the base of the structure. Again, in addition or in the alternative, the structure may be embedded in the sediments.

Only an upper region, eg the top surface, of these sediments may be treated or they may be treated substantially throughout.

In the case of the preferred form of wave collector having a lower canopy area, sediment is pumped into the latter and permeated with lime water and carbon dioxide so that it is stabilised. Lime water and carbon dioxide constitute a particularly preferred treatment for any application. This may also be done with other structures. Other forms of structure or wave collectors may, for example, be embedded in the sediment and the sediment immediately surrounding the structure can then be chemically treated.

It is also possible to place broken rock around the outside of the structure when it is anchored in place.

It is also preferred for the canopy of a wave collector to be divided into a plurality of cells, eg. by one or more internal walls. The oscillating water surface level in a given cell will not usually be completely in phase with the oscillation in another cell. The applicants have found that this effect may be utilised to smooth energy conversion rate with respect to time.

Thus, a fifth aspect of the present invention provides a wave collector comprising a generally hollow canopy having at least one opening, said canopy being divided internally into a plurality of cells, at least two of said cells having internal dimensions different from each other such that the ratio of median waterline cross-sectional area of one of said at least two cells to the median waterline cross-sectional area of the other is in the range of from 3:1 to 1:3.

It is especially preferred that this ratio is substantially 2:1.

The median waterline is the level inside the canopy corresponding to the average water level during use.

The arrangement according to the fifth aspect of the invention is intended to cause a substantially phase quadrature difference between the water levels in the respective at least two cells at any one time.

The present invention also includes a structure in accordance with any one of the first, second, third, or fifth aspects of the present invention, optionally including when anchored by the method according to the fourth aspect, in combination with either or both of the other aspects and/or any preferred features described in relation thereto.

In general, a plurality of a wave energy converters at least one of which comprises a feature in accordance with any aspect of the invention, may be placed in spaced relation to one another and operated together to provide the required power. Any such converter may also be provided with other advantageous features such as means enabling vessels to moor alongside, or a helicopter landing platform, or overhead cableway ashore.

We may also claim any wave energy converter or any wave collector comprising any feature hereindescribed such that the converter or collector so defined is novel.

The present invention will now be illustrated by way of the following description of a preferred embodiment and with reference to the accompanying drawings, in which.

Figure 1:
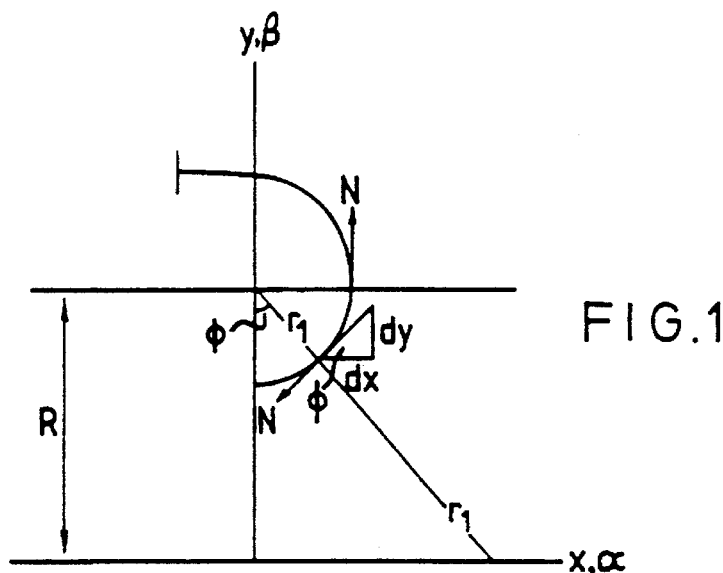
FIG. 1 shows a graphical representation of the radial profile of an isotorus shell of a wave collector according to the first aspect of the present invention.
Figure 2:
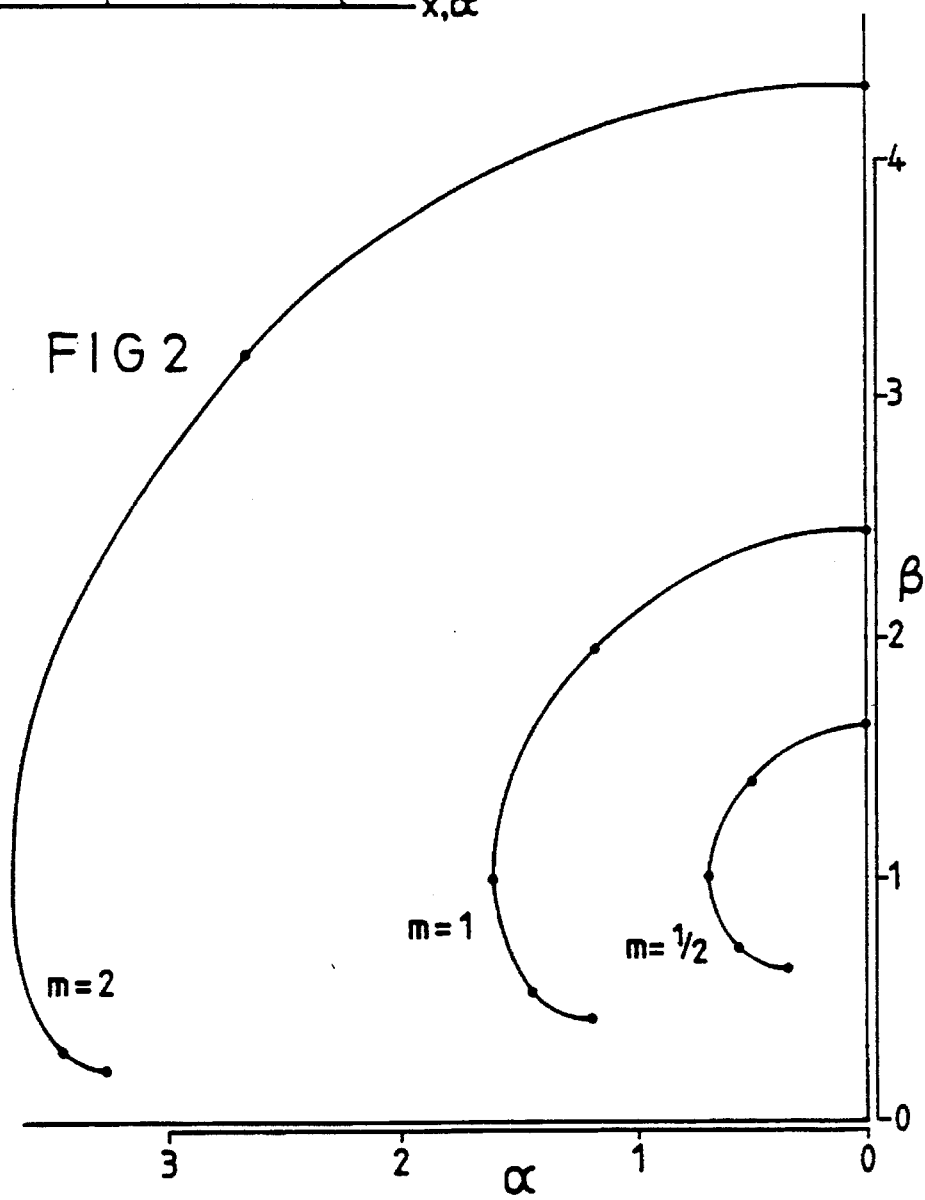
FIG. 2 shows some different solutions for radial profiles derived with reference to FIG. 1.
Figure 3:
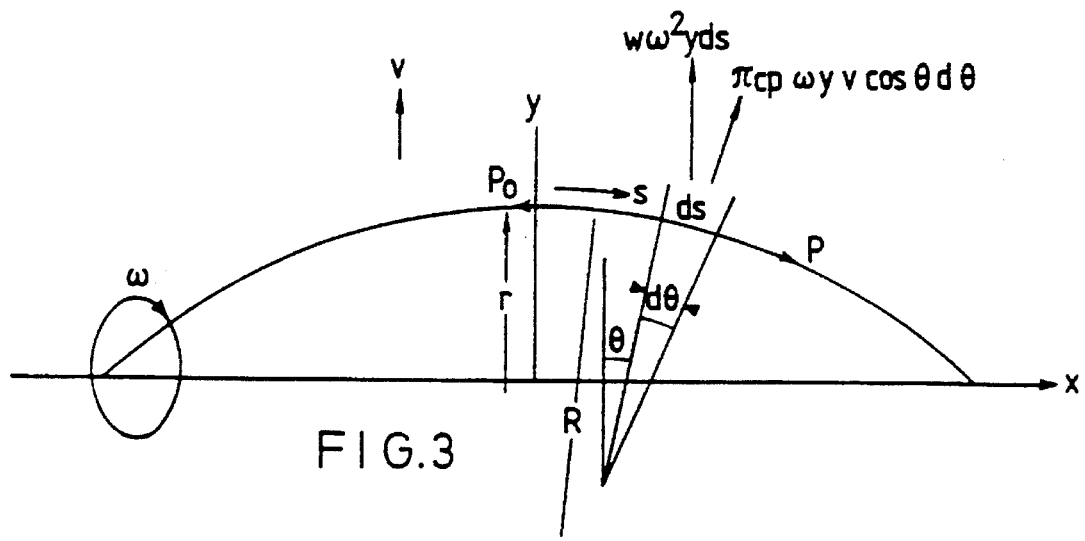
FIG. 3 shows a graphical representation of a Darius rotor blade for use in accordance with the third aspect of the present invention.
Figure 4:
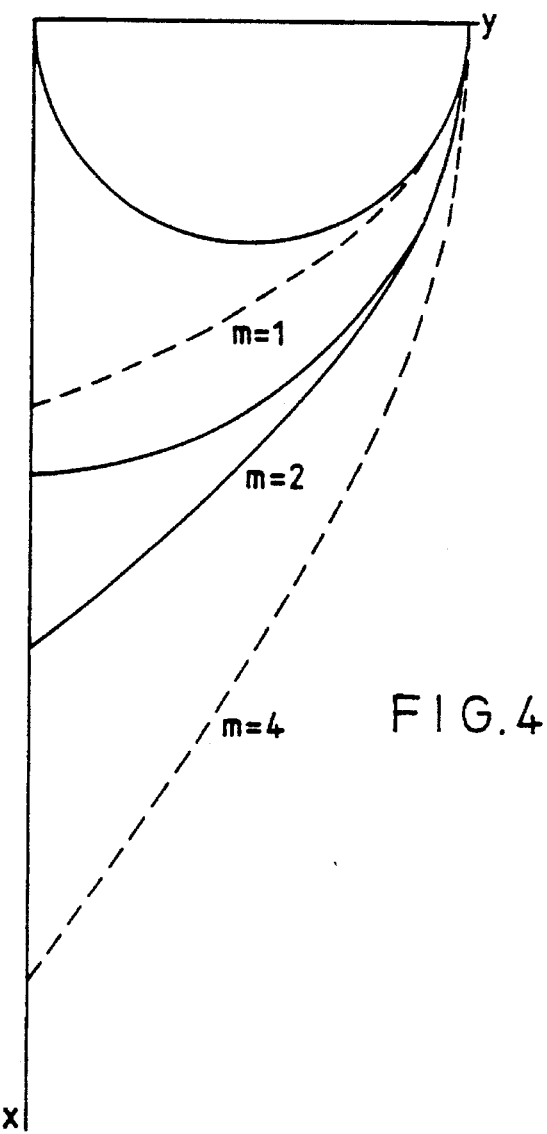
FIG. 4 shows some different solutions for rotor shapes derived with reference to FIG. 3.
Figure 5:
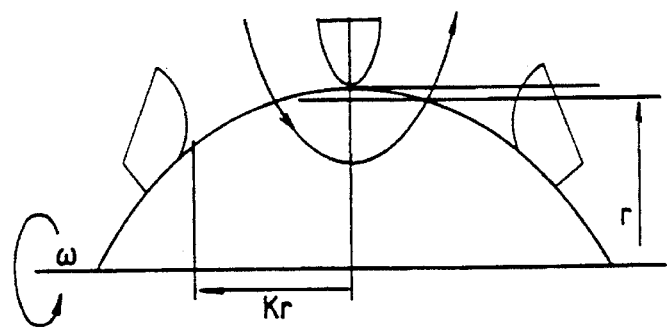
FIG. 5 shows a graphical representation of a Darius rotor in axi-symmetric flow.
Figure 6:
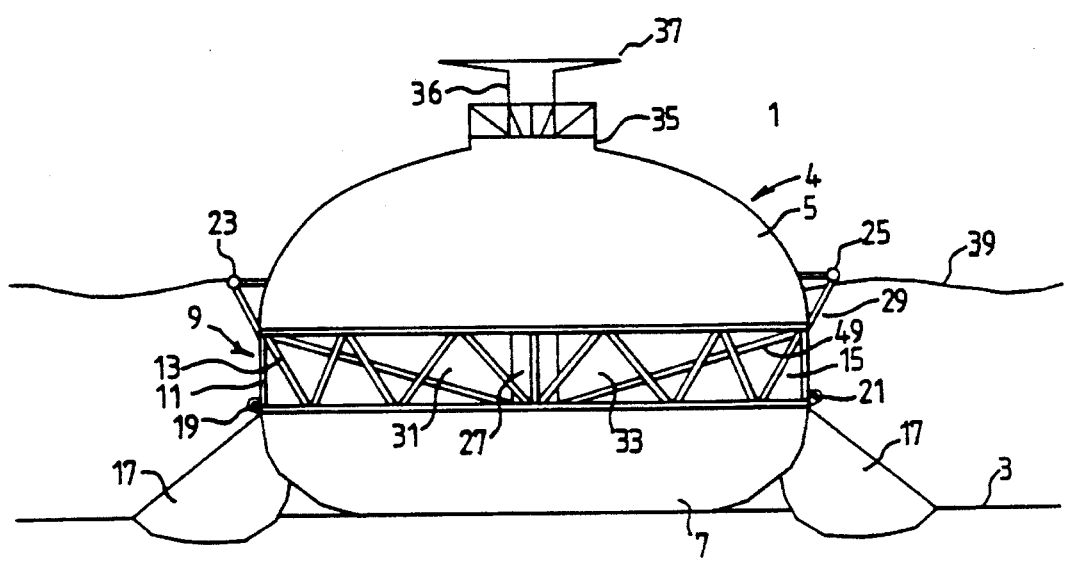
FIG. 6 shows a side view of a wave energy converter with an isotorus collector and in accordance with the present invention.

Referring to FIG. 6, a wave energy converter 1 is anchored to the sea bed 3 by stabilised sediment in a manner to be described hereinbelow. The structure comprises a shell 4, an upper canopy 5 and a lower canopy 7, separated by a cage structure 9 comprising struts 11, 13 etc. The separation effected by the cage structure defines an opening 15 for ingress of waves.

Anchoring the sea bed is further aided by approximately 6000 cubic meters of dumped stone armour 17 surrounding the lower canopy. Towing pad eyes 19, 21 are provided to enable the structure to be towed into position. Barge bumpers 23, 25 enable service vessels to moor alongside.

The hollow central core 27 of the isotorus wave collector 29 is visible through the opening 15, as are radial dividers 31, 33. The top of a rotor housing 35 extends above the upper canopy and is surrounded by a generator housing 36 and a helicopter landing platform 37.

When correctly installed on-site, the opening 15 is situated below sea-level 39.

Figure 7:
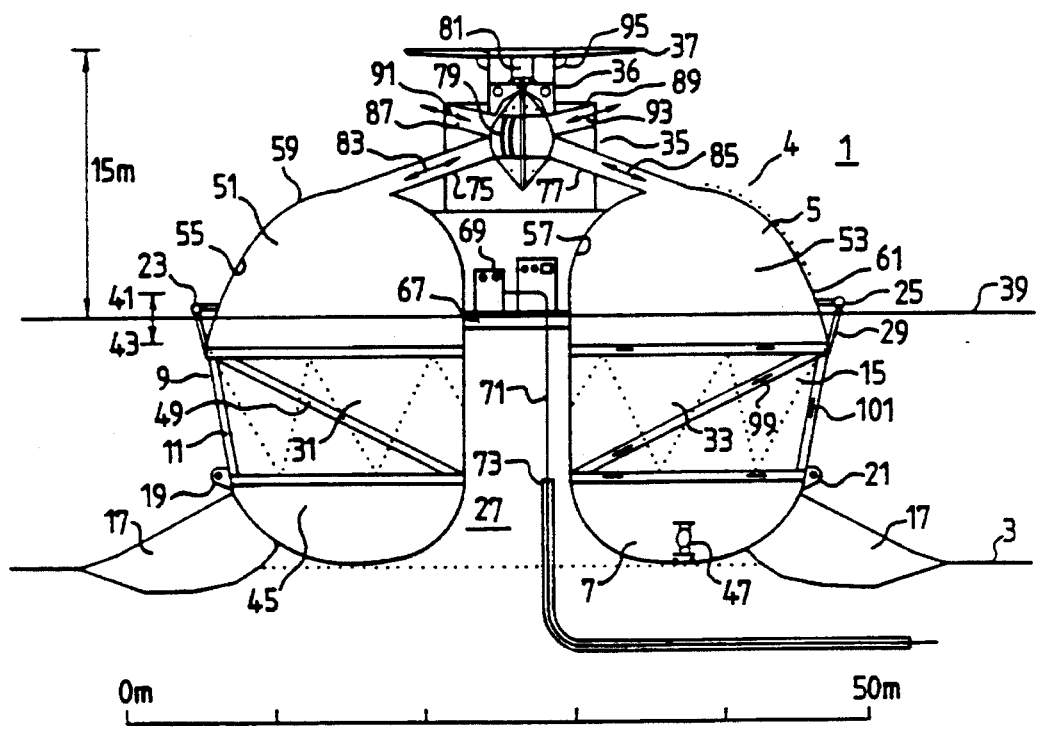
FIG. 7 shows an axial cross-sectional view through the converter shown in FIG. 6.

The structure shown in FIG. 6 is depicted in axial cross-section in FIG. 7. Relevant components are designated by the same reference numerals. The overall dimensions of the structure are shown in this Figure. It is designed to operate with a maximum wave amplitude between maximum level 41 and minimum level 43.

The lower canopy contains approximately 4200 cubic metres pumped fill sediment 45 introduced and stabilised by chemical treatment (to be described hereinbelow) via a flooding control valve 47. A tubular steel frame 49 supports the radial dividers 31, 33 which respectively form one boundary of a pair of cells 51, 53. The peripheries 55, 57 of the dividers abut the respective cell walls 59, 61 which are integral with the upper canopy, except the lower edges 63, 65 thereof which are attached to the tubular frame and transverse the opening of the shell, extending inwardly and downwardly.

A pressure bulkhead 67 extends across the central hollow core, above which is situated control equipment 69 which transfers electrical energy generated by the converter to a subsea cable 71 which connects with the shore via piped cable duct 73 extending beneath the seabed.

The cells communicate via ducts 75, 77 with the housing 35 in which is located a Darius rotor 79 which is attached to a 7 Mw generator 81 in the housing 36. Alternatively, first and second Darius rotors may respectively be fixed to opposite ends of the shaft driving the generator, for receiving/delivering air to two respective cells.

In use, in response to changes in water height, due to waves, air flows between the cells and rotor via the ducts 75, 77 in both directions as indicated by arrows 83, 85 and between the rotor and the external atmosphere via further ducts 87, 89 in both directions as indicated by arrows 91, 93. As explained hereinbefore, the rotor turns in the same direction, regardless of the direction of airflow.

A navigation beacon 95 is attached to the outside of the generator housing, directly underneath the helicopter landing pad. Clambering rings 97, are attached to the outside of the upper canopy to permit access to and from any vessel moored alongside. Sacrificial anodes 99, 101 are attached to the cage structure and tubular steel support frame to prevent corrosion.

Figure 8:
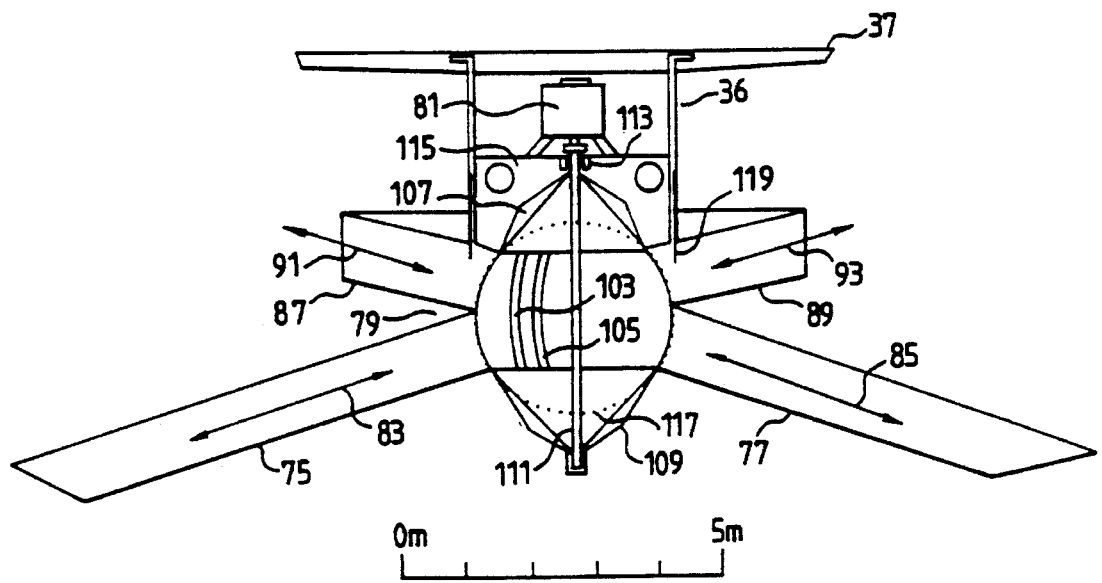
FIG. 8 shows the Darius rotor of the converter shown in FIGS. 6 and 7, together with associated components.

The arrangement of the Darius rotor, together with the ducts and generator is shown in FIG. 8. The scale is shown below the drawing.

The rotor comprises a plurality of aerofoil blades 103, 105 etc extending between an upper support 107 and a lower support 109 mounted on a shaft 111. The blades thus constitute a "squirrel cage" structure. The shaft is connected to the generator 81 via a coupling 113. The generator is mounted on a support frame 115.

The precise number of blades, together with their aerofoil surface profile, shape of curvature and overall size are determined as described hereinbefore. The central portion of the blades approximately follows the curvature of a nominal sphere shown by the broken line 117.

An upper drop gate 119 both controls power output from heave and seals the pneumatic turbine (rotor and generator) against entry of water when overtopped. In the closed state, the generator is able to operate at full power by continued extraction of surge and pitch power. Lowering the drop gate beyond midstroke permits control of power extraction and in the limit effects shutdown in the event of any electrical or mechanical fault.

Figure 9:
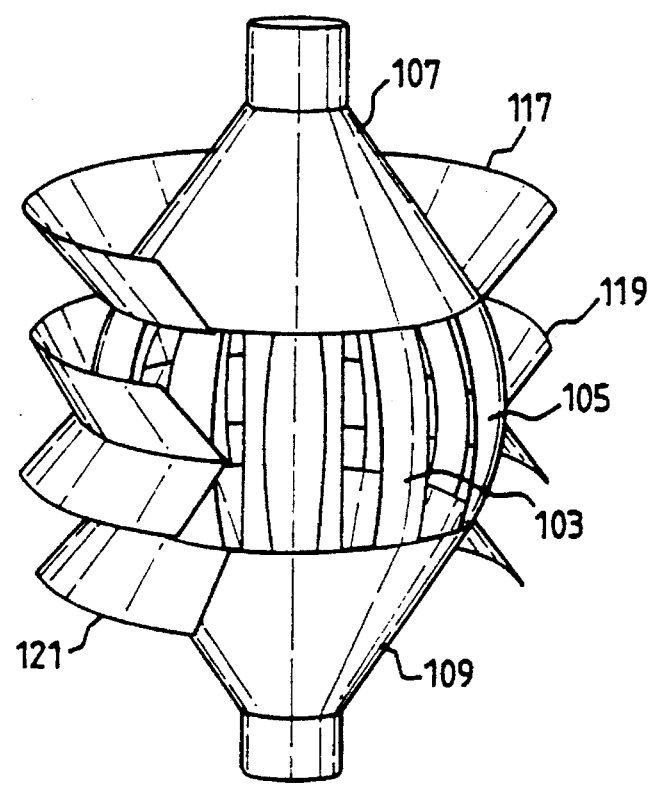
FIG. 9 shows a cut-away perspective view the Darius rotor shown in FIG. 9, with baffle plates for directing air into and out of the ducts.

As shown in FIG. 9, upper 117, middle 119 and lower 121 baffle plates (shown partly cut-away) are provided for directing airflow into and out of the ducts 75, 77, 87, 89. Obviously, the rotor must be able to rotate freely inside these plates.

Figure 10:
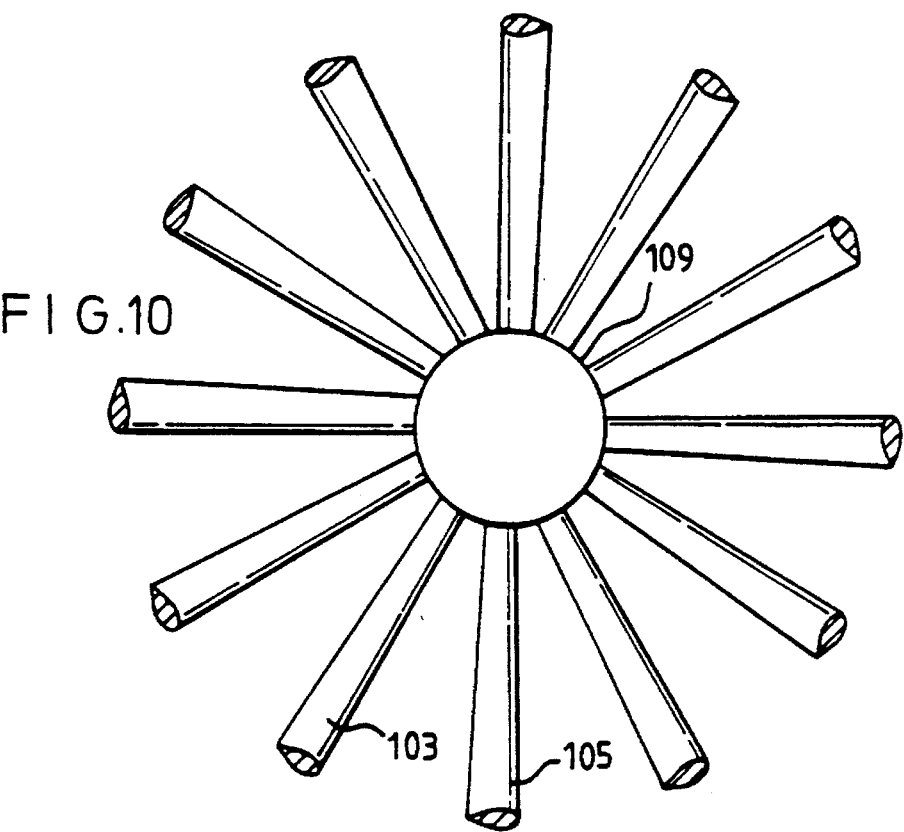
FIG. 10 shows a radial cross-section through the centre of the Darius rotor shown in FIGS. 8 and 9.

The cross-section view through the central radial plane of the rotor as illustrated in FIG. 10 shows the aerofoil profile of the blades. As depicted, the rotor will rotate anti-clockwise as air flows into and out of the rotor cage structure.

Figure 11:
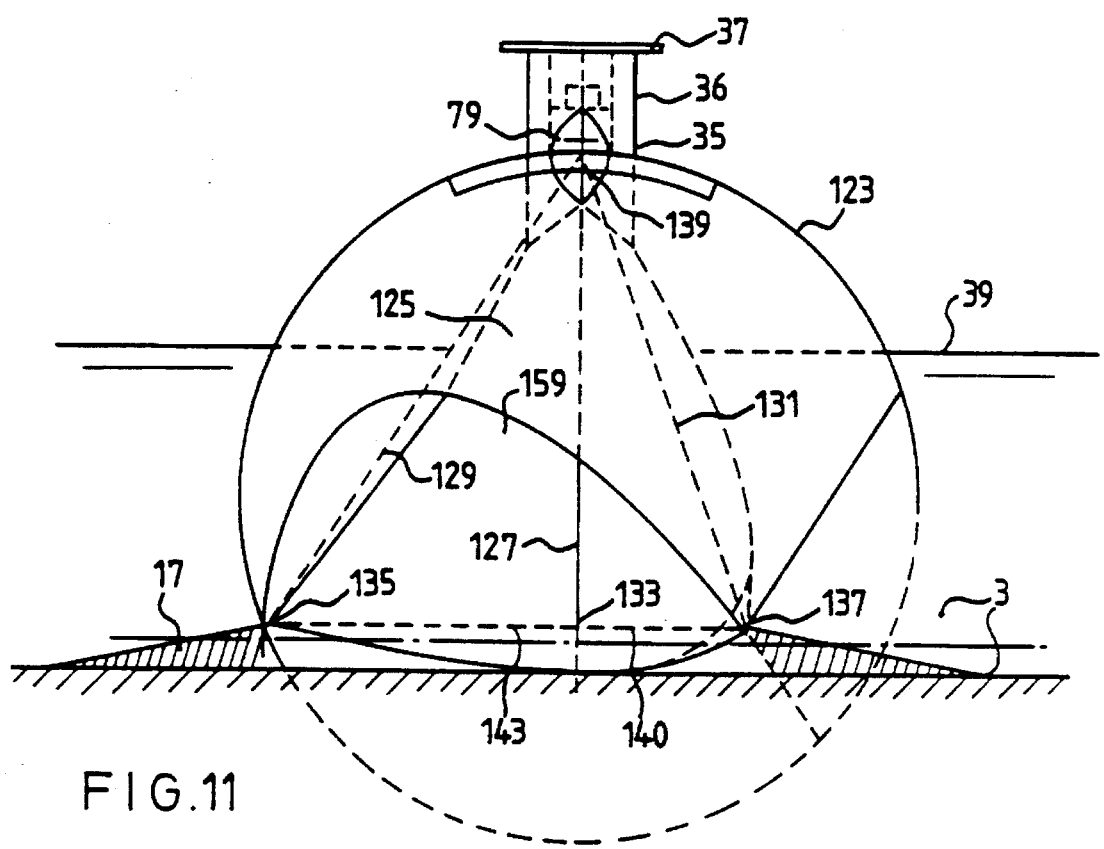
FIG. 11 shows an outline perspective view of a wave energy converter with a three cell sphere tetron-collector and in accordance with the second aspect of the present invention.
Figure 12:
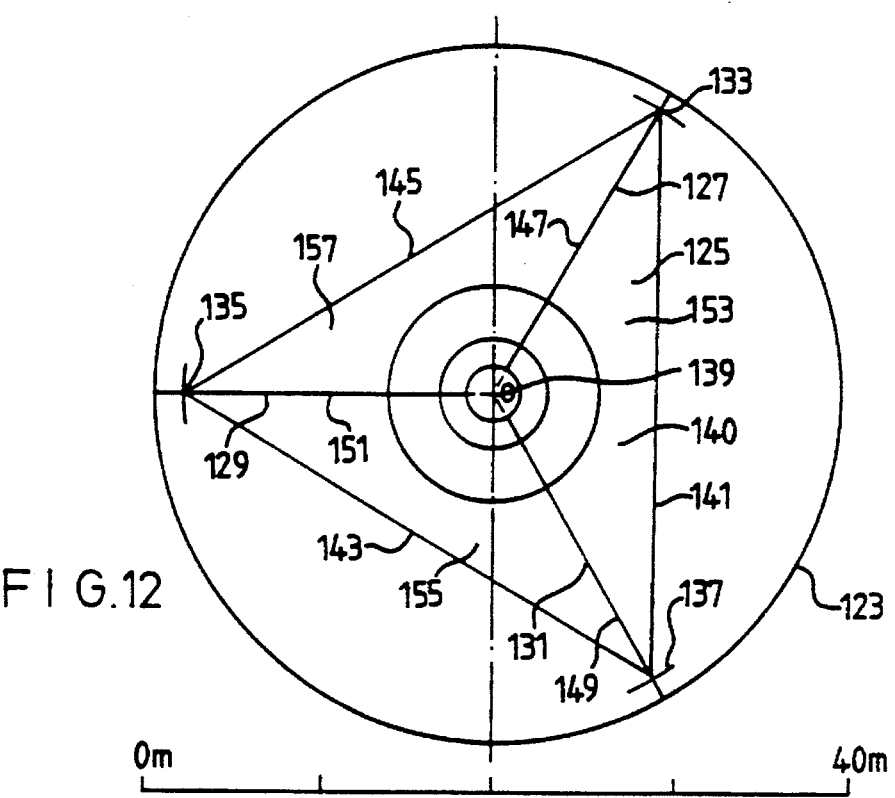
FIG. 12 shows the arrangement of cell dividers in the convertor shown in FIG. 11.

FIGS. 11 and 12 show another embodiment of a wave energy converter based on a three cell sphere-tetron collector in place of the isotorus collector as shown in FIGS. 6 and 7. The same reference numerals are used for the sea surface, sea-bed, stone armour and the rotor/generator structure, as are used in the latter two Figures.

The converter comprises a collector having a truncated spherical canopy 123 partly embedded in the sediment on the sea bed. An inflated tetrahedral internal shell 125, concentric within the sphere, is defined by three outwardly curved downward extensions 127, 129, 131 which engage with the three lower vertices 133, 135, 137 of the tetrahedron, respectively. The fourth vertex 139 is located at the top of the collector, adjacent the rotor and generator. The base 140 of the tetrahedral core is defined by three substantially straight horizontal members 141, 143, 145.

The lower part of the spherical canopy is filled with sediment at least up to the level of the surrounding sea bed, or more preferably, to the level of the base of the tetrahedral frame and surrounding stone armour 17. Further details concerning the method of anchoring are recited hereinbelow.

The radial plane interstices between the canopy and edges of the inflated tetrahedron are occupied by divider plates 147, 149, 151 to define three cells 153, 155, 157. Ducting of airflow between the cells and rotor and between the rotor and the exterior is analogous to that used in the previously described isotorus embodiment.

Partly circular openings 159 etc (eg. semicircular or ⅓ circular) are provided in the canopy, positioned to be abut the base sides of the tetrahedron. These openings permit ingress and egress of waves. The wave energy converter otherwise functions in an analagous manner to the isotorus embodiment.

In essence, the inflated tetrahedral frame consists of four 60° cones with axes intersecting, so as to acquire the necessary "inflated" shape giving excellent internal pressure strength, (this may be demonstrated by inflating a rectangular paper or polyethylene bag).

The connection between sphere and frame may be envisaged with the aid of an imaginary cube, with one point uppermost, so that diagonals of the six faces form the edges of the tetrahedron. The uppermost three faces of the cube then locate the concentric canopy surface at seven points of the cube, so as to become curvilinear square. The latter may be uniformly subdivided by equi-spaced great circles and circles of latitude, and are fabricated from edge profiled, but jointed strips of plating of approximately uniform widths.

Anchorage of these structures by stabilised sediment fill will now be described in more detail.

The completed structure of either embodiment may be floated light from the construction site in less than 2 meters of water, with ample freeboard for towing and high stability. After it is floated above the bed for final location and has been flooded, air is bled from the upper canopy area so that it sinks quickly. Slight wave induced vertical oscillations when floating above the site assist formation of an initial bed. The lower canopy is then pump filled with sediment to provide gravity anchorage. The sediment fill is then permeated with lime water and carbon dioxide, or with any other suitable stabilising chemical treatment.

Using the lime-water and carbon dioxide system for filing the pore space in the sediment reduces permeability. It does not, and there is no need for it, to induce cohesive strength. The chalk precipitated by the resultant chemical reaction has a measured brittle strength ranging from that of kettle fur deposits to stalactite, depending on the rate of deposition.

In practice, an effective generating station may comprise a plurality of wave energy converters spaced apart at suitable intervals, for example in a linear arrangement, at a location where the incident wave power is at an appropriate level.

Figure 13:
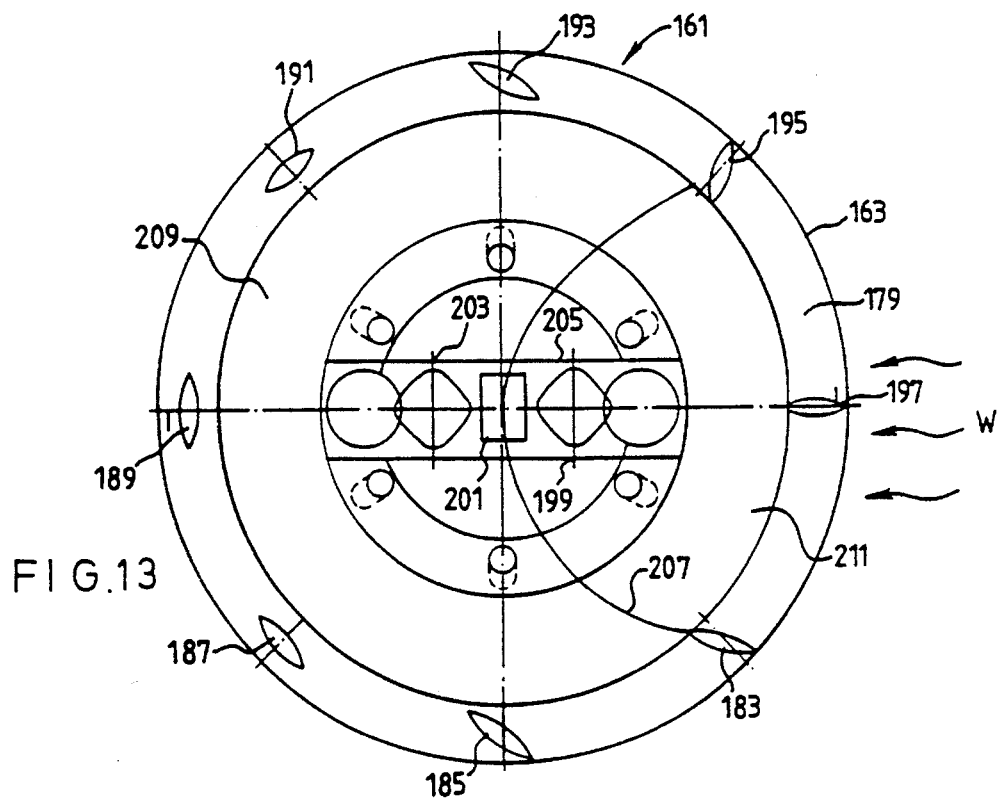
FIG. 13 shows a radial cross-section through another collector according to the present invention, having a cell divider arrangement for effecting phase quadrature between water levels in adjacent cells.
Figure 14:
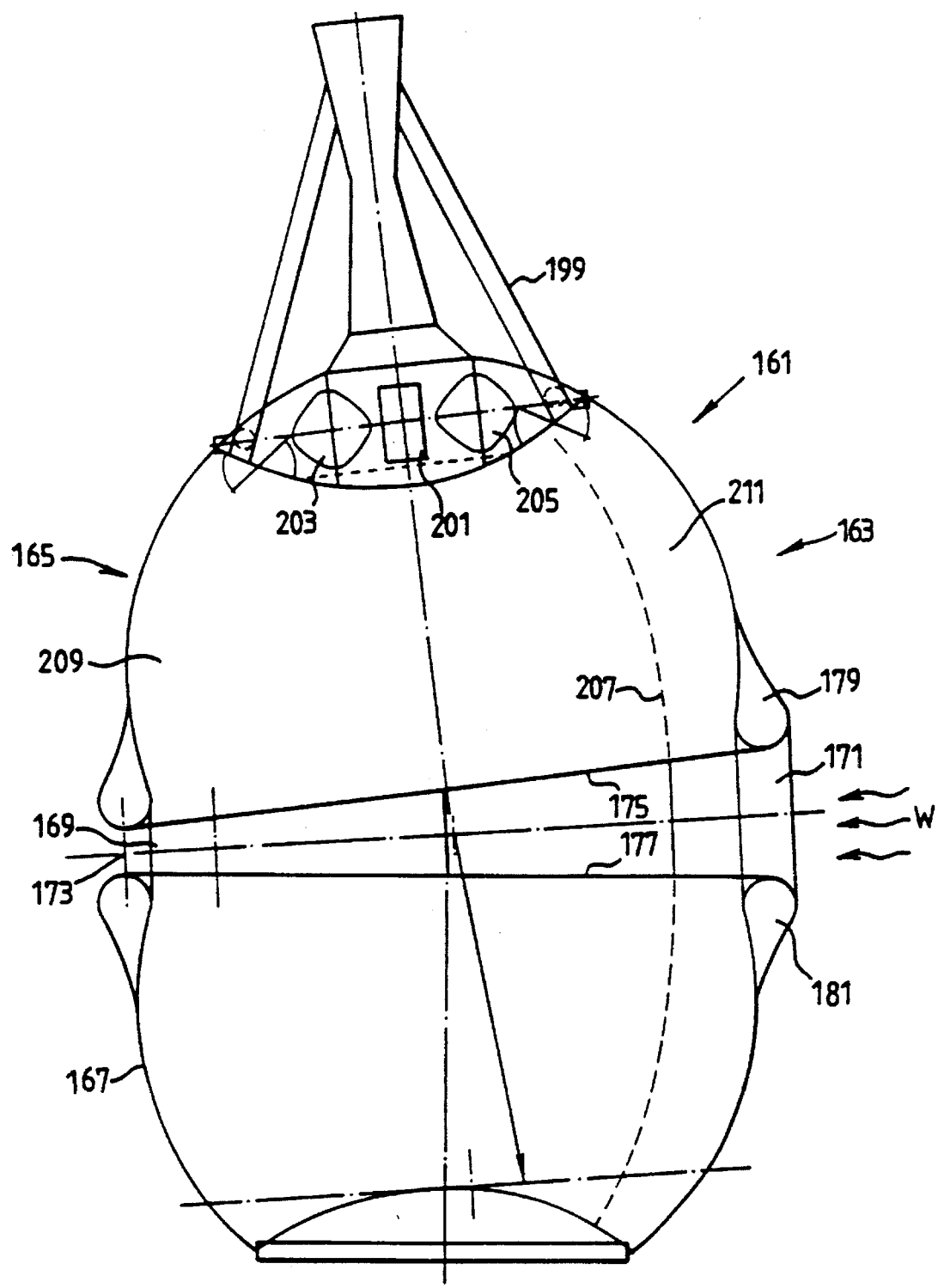
FIG. 14 shows an axial cross-section through the collector shown in FIG. 13.

Referring now to FIGS. 13 and 14, an alternative configuration of collector 161 is arranged to collect waves W from the right-hand side of the drawings.

The collector comprises a canopy 163 having an upper portion 165 and a lower portion 167 separated by a tapering opening 169 which is wider at the front 171 facing the waves W then the at rear 173 on the opposite side.

The two opposing rims 175, 177 of the respective upper and lower portions defining the opening are provided with respective channels 179, 181 which are tear-drop shape in cross-section. These channels assist ingress of water they have internal aerofoil shaped supporting struts 183–197.

A central tower 199 is provided with a generator 201, a pair of Darius rotors 203, 205 on opposite ends of a shaft driving the generator.

The canopy is divided by an arcuate cell divider 207 into a larger cell 209 at the rear and a smaller cell 211 at the front facing the waves. The ratio of radial cross-section (FIG. 13) cross-section area of the larger cell 209 to that of the smaller cell 211 is approximately 2:1.

Figure 15:
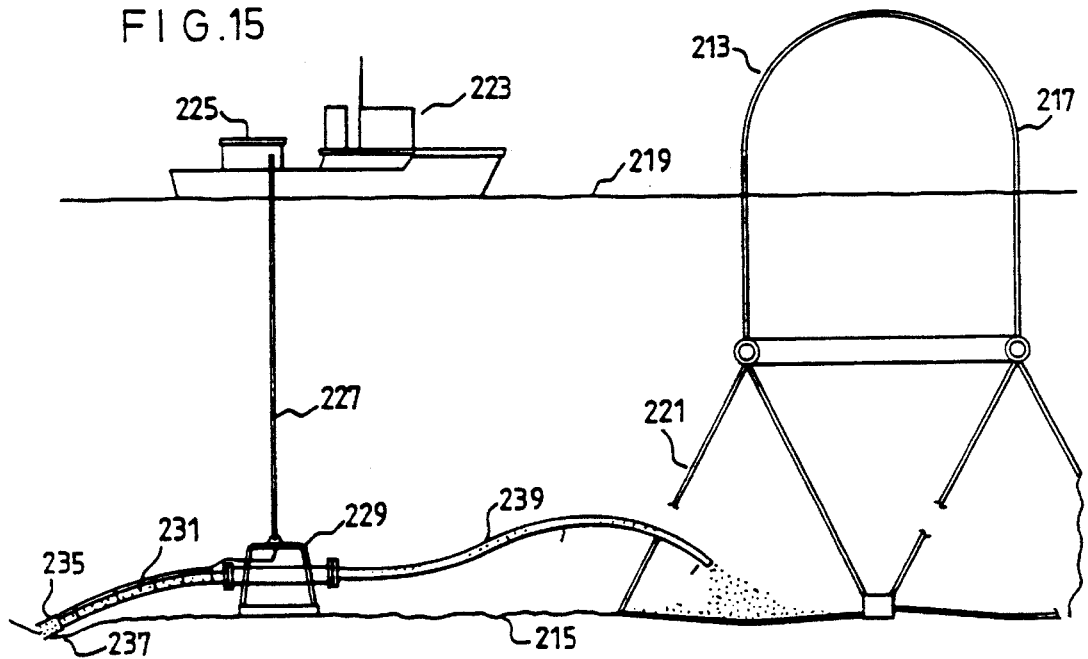
FIG. 15 shows a method of structure anchoring according to the present invention.

FIG. 15 shows details of how a wave collector 213 is anchored on the sea bed 215. The wave collector canopy 217 extends above the water-line 219. The collector rests on a support structure 221.

A ship 223 is equipped with a high pressure water pump and tank 225 which is connected via line 227 to a sub-sea connector 229. A high pressure water hose 231 provided with a terminal suction head 235 pumps sediment 237 via a delivery hose 239 into the support structure via the open end 241 of the hose.

If necessary the same hose can be used to deliver chemicals to the pumped sediment to stabilise it.

In the light of this disclosure, modifications of the described embodiments as well as other embodiments, all within the scope of the present invention as defined by the appended claims will now be apparent to persons skilled in the art.

I claim:

1. A wave collector comprising a generally hollow canopy having at least one opening for ingress of waves, said canopy having an internal datum level defining a median water level when in use, said at least one opening defining a water inlet area, wherein the ratio of the water inlet area to the internal cross-sectional area of the canopy at the internal datum level is less than 0.7.

2. A wave collector according to claim 1, wherein said ratio is less than 0.6.

3. A wave collector according to claim 2, wherein said ratio is less than 0.5.

4. A wave collector according to claim 1, wherein said ratio is more than 0.4.

5. A wave energy converter comprising a Darius-type rotor arranged in a housing provided with at least one opening for directing an oscillating air flow onto or away from the rotor in an axisymmetric manner, wherein the rotor comprises a plurality of blades in a substantially catenary shape such that centrifugal loads are substantially balanced by blade tension forces.

6. A wave energy converter according to claim 5, wherein the blades are substantially uniformly spaced.

7. A wave energy converter according to claim 5, wherein the rotor is provided with from 3 to 25 blades.

8. A wave energy collector according to claim 5, wherein the blades are constructed of solid steel.

9. A wave energy converter according to claim 5, wherein the blades comprise glass fiber loaded polyethylene extruded to aerofoil section around a longitudinal matrix of high strength steel wires.

\* \* \* \* \*